United States Patent
Hartung et al.

(10) Patent No.: US 9,951,623 B2
(45) Date of Patent: Apr. 24, 2018

(54) BLADE CASCADE FOR A TURBOMACHINE

(71) Applicant: MTU Aero Engines AG, Munich (DE)

(72) Inventors: Andreas Hartung, Munich (DE); Frank Stiehler, Bad Liebenwerda (DE); Martin Pernleitner, Dachau (DE)

(73) Assignee: MTU AERO ENGINES AG, Munich (DE)

( * ) Notice: Subject to any disclaimer, the term of this patent is extended or adjusted under 35 U.S.C. 154(b) by 300 days.

(21) Appl. No.: 14/801,103

(22) Filed: Jul. 16, 2015

(65) Prior Publication Data

US 2016/0024928 A1  Jan. 28, 2016

(30) Foreign Application Priority Data

Jul. 22, 2014  (DE) .................. 10 2014 214 270

(51) Int. Cl.
*F01D 5/06* (2006.01)
*F01D 5/16* (2006.01)
(Continued)

(52) U.S. Cl.
CPC .............. *F01D 5/06* (2013.01); *F01D 1/02* (2013.01); *F01D 5/142* (2013.01); *F01D 5/16* (2013.01); *F01D 5/22* (2013.01); *F01D 9/041* (2013.01); *F05D 2220/32* (2013.01); *F05D 2240/129* (2013.01); *F05D 2240/30* (2013.01); *F05D 2250/241* (2013.01); *F05D 2260/961* (2013.01);
(Continued)

(58) Field of Classification Search
CPC ..... F01D 5/06; F01D 5/10; F01D 1/02; F01D 1/04; F01D 5/142; F01D 5/16; F01D 5/22; F01D 9/041; F01D 25/06; F05D 2220/32; F05D 2240/129; F05D 2240/30; F05D 2250/241; F05D 2260/961; F05D 2300/607
See application file for complete search history.

(56) References Cited

U.S. PATENT DOCUMENTS 2,349,187 A   5/1944  Meyer
6,827,551 B1  12/2004 Duffy et al.
(Continued)

FOREIGN PATENT DOCUMENTS

DE   60112690 T2   2/2006
DE   102009010185 A1   8/2010
(Continued)

*Primary Examiner* — Logan Kraft
*Assistant Examiner* — Peter T Hrubiec
(74) *Attorney, Agent, or Firm* — Barlow, Josephs & Holmes, Ltd.

(57) ABSTRACT

A blade cascade for a gas turbine, which has a first group with at least two, in particular at least three, first blade arrangements of the same type to one another, on which first element arrangements that are identical to one another and have at least one first element are movably mounted; and a second group with at least two, in particular at least three, second blade arrangements, which are of the same type to one another and are of different type from the first blade arrangements, on which second element arrangements, which are identical to one another and have at least one second element are movably mounted, wherein first and second element arrangements are different from each other.

9 Claims, 2 Drawing Sheets

(51) Int. Cl.
  *F01D 5/22* (2006.01)
  *F01D 9/04* (2006.01)
  *F01D 5/14* (2006.01)
  *F01D 1/02* (2006.01)

(52) U.S. Cl.
  CPC ....... *F05D 2300/607* (2013.01); *Y02T 50/671* (2013.01)

(56) References Cited

U.S. PATENT DOCUMENTS

| | | |
|---|---|---|
| 2002/0067991 A1 | 6/2002 | Montgomery et al. |
| 2002/0074102 A1 | 6/2002 | Wang |
| 2009/0056126 A1 | 3/2009 | Chivers et al. |
| 2015/0110604 A1* | 4/2015 | Calza ................. F01D 5/16 |
| | | 415/119 |

FOREIGN PATENT DOCUMENTS

| | | |
|---|---|---|
| EP | 2484870 A1 | 8/2012 |
| EP | 2578801 A1 | 4/2013 |
| EP | 2884050 A1 | 6/2015 |
| GB | 2111130 A | 6/1983 |
| WO | 2012038406 A1 | 3/2012 |

* cited by examiner

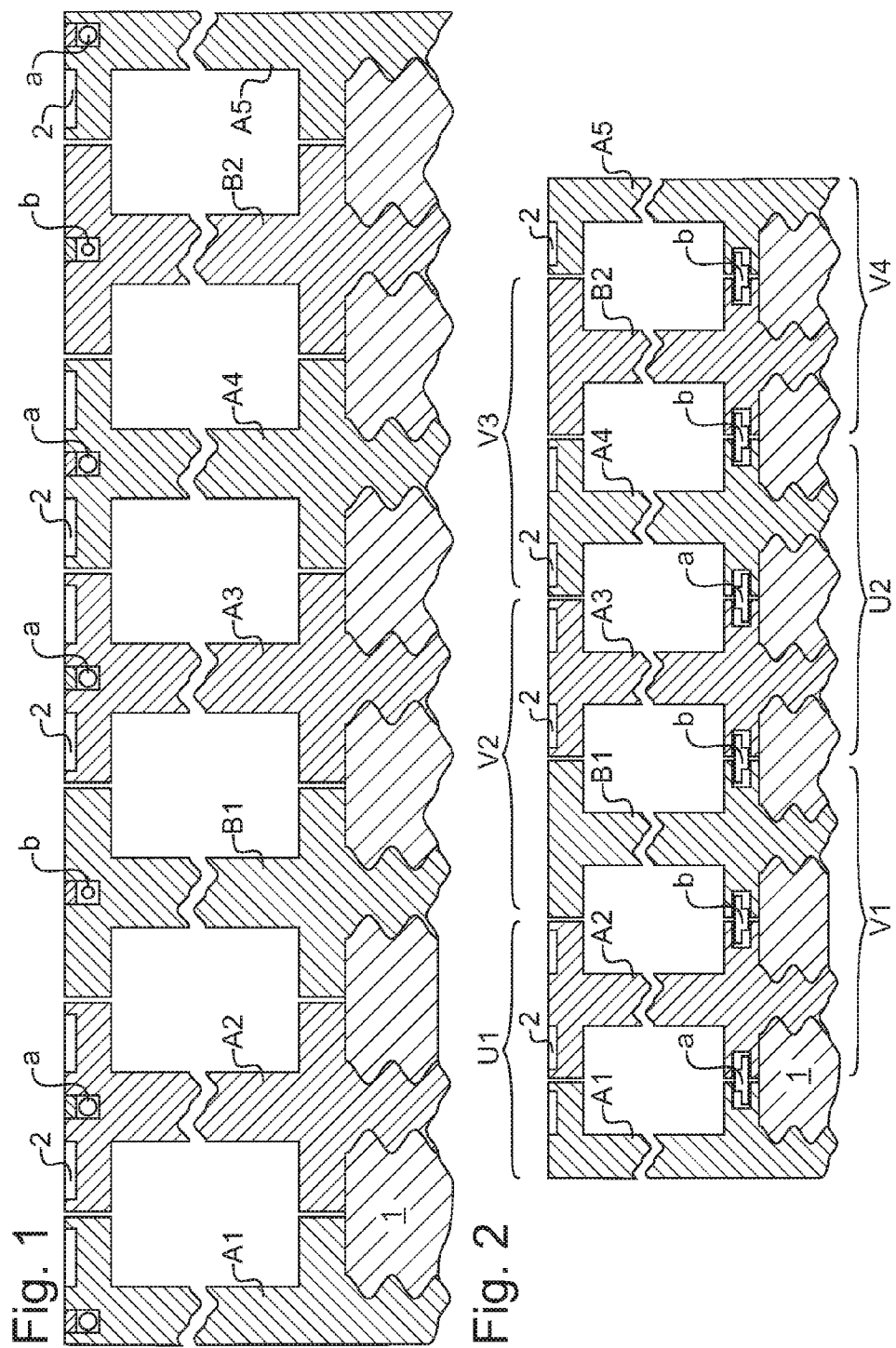

BLADE CASCADE FOR A TURBOMACHINE

BACKGROUND OF THE INVENTION

The work that led to this invention was funded under Grant Agreement No. CSJU-GAM-SAGE-2008-001 as part of the European Union's Seventh Framework Program (FP7/2007-2013) for the Clean Sky Joint Technology Initiative.

The present invention relates to a blade cascade for a turbomachine, in particular a gas turbine, particularly an aircraft engine, a turbomachine having such a blade cascade, and a method for producing such a blade cascade.

In order to reduce vibrational phenomena, in particular resonance phenomena, the characteristic frequencies of blade cascades can be detuned. For this purpose, it is known, according to WO 2012/038406 A1, to provide blades of diverse type, which are, as a result, detuned in their characteristic frequencies. By contrast, WO 2012/038406 A1 proposes to replace such blades of diverse type and instead to provide different attenuating elements for blades of the same type. Any loss in performance is prevented by blades of the same type.

BRIEF SUMMARY OF THE INVENTION

An object of an embodiment of the present invention is to provide a turbomachine This object is achieved by a blade cascade of the present invention. Also disclosed herein, the invention provides a turbomachine having such a blade cascade and to a method for producing such a blade cascade. Advantageous embodiments of the invention are discussed in detail below.

According to an aspect of the present invention, a blade cascade for a turbomachine or a blade cascade of a turbomachine comprises a first group of at least two, in particular at least three, in particular at least four blade arrangements, which are of the same type and therefore are referred to below as first blade arrangements.

On at least two, in particular at least three, in particular at least four first blade arrangements that are of the same type to one another, in particular a majority of all first blade arrangements that are of the same type to one another, in particular all first blade arrangements that are of the same type to one another, a respective first element arrangement, each of which has at least one first element, is or will be movably mounted, with these first element arrangements being identical to one another.

Thus, if the blade cascade has 20 blades, for example, 12 blades of which are of the same type to one another, then on at least 7 of these first blades, respective element arrangements that are identical to one another are or will be movably mounted when one of the first element arrangements that are identical to one another is or will be mounted on a majority of all first blade arrangements that are of the same type to one another.

The blade cascade further has a second group having at least two, in particular at least three, in particular at least four blade arrangements that are of the same type to one another and of different type than the first blade arrangements and are therefore referred to below as second blade arrangements.

On at least two, in particular at least three, in particular at least four of these second blade arrangements that are of the same type to one another and of different type from the first blade arrangements, in particular a majority of all second blade arrangements that are of the same type to one another and of different type from the first blade arrangements, in particular all of the second blade arrangements that are of the same type to one another and of different type from the first blade arrangements, a second respective element arrangement, which has at least one second element, is or will be movably mounted, with these second element arrangements being identical to one another.

Thus, if the blade cascade has three blades of the same type to one another, A1, A2, and A3, as well as four blades of the same type to one another, B1, B2, B3 and B4, which are of different type from the blades A1, A2, and A3, then the blades A1, A2, and A3 form the first blade arrangements and the blades B1, B2, B3, and B4 form the second blade arrangements in the sense of the present invention.

According to an aspect of the present invention, the first and second element arrangements are different from each other. In other words, the element arrangements will be or are assigned to the blade arrangements in a specific manner or in a systematic manner that is type-specific or in a manner that depends on the type of blade arrangement. Surprisingly, it has been found that such an assignment of different blade arrangements to blade arrangements of different type can reduce undesired vibrations of the blade cascade more strongly than in the case when different blade arrangements are distributed in an indiscriminate manner or in a manner that is independent of the type of blade arrangement or else on blade arrangements of the same type. In an enhancement, this assignment can be injective, surjective, or bijective in this case. Correspondingly, in one embodiment, first blade arrangements have only first element arrangements and second blade arrangements have only second element arrangements. Additionally or alternatively, in one embodiment, first element arrangements will be or are mounted only on first blade arrangements and second element arrangements will be or are mounted only on second blade arrangements.

In one embodiment, the blade cascade is composed of the first and second group; that is, it has only two different types of blade arrangements. In another embodiment, the blade arrangement has, besides the first and second blade arrangements, also at least one third group having one, two, or more blade arrangements that are of the same type to one another and of different type than the first and second blade arrangements and are therefore referred to below as third blade arrangements.

In one embodiment, a respective third element arrangement, which has at least one third element, is movably mounted on at least one, in particular at least two, in particular at least three, in particular at least four of such third blade arrangements that are of the same type to one another and of different type from the first and second blade arrangements, in particular a majority of third blade arrangements that are of the same type to one another and of different type than the first and second blade arrangements, in particular all third blade arrangements that are of the same type to one another and of different type than the first and second blade arrangements, with these third element arrangements being identical to one another and different than the first and second element arrangements.

Thus, for example, if the blade cascade has three blades of the same type to one another, A1, A2, and A3, four blades of the same type to one another, B1, B2, B3, and B4, which are of different type than the blades A1, A2, and A3, and two blades of the same type to one another, C1 and C2, which are of different type than the blades A1, A2, and A3 and of different type than the blades B1, B2, B3, and B4, then the blades A1, A2, and A3 form first blade arrangements, the blades B1, B2, B3, and B4 form second blade arrangements, and the blades C1 and C2 form third blade arrangements in the sense of the present invention.

In this case, at least two identical element arrangements are or will be movably mounted on blade arrangements of one of the groups and at least two further element arrangements, which are of different type from them and of the same type to one another, are or will be mounted on blade arrangements of at least one other of the groups. For example, the three blades A1, A2, and A3 can be equipped with the same element arrangements a and the three blades B1, B2, and B3 can be or can become equipped with the same element arrangements b, whereas the fourth blade B4 and the blades C1, C2 have no element arrangements. Preferably, however, all three blades A1, A2, and A3 are or will be equipped with the same element arrangements a, all four blades B1, B2, B3, and B4 are or will be equipped with the same element arrangements b, and both blades C1 and C2 are or will be equipped with the same element arrangements c.

The blade arrangements of the groups can be or can become distributed uniformly or regularly, in particular alternating singly or in pairs, over the periphery of the blade cascade; that is, for example, A1, B1, A2, B2, . . . (alternating singly) or A1, A2, B1, B2, A3, . . . (alternating in pairs). In this way, it is possible advantageously to create a blade cascade that is as rotationally symmetric as possible. Equally, the blade arrangements of the groups can also be or will be distributed non-uniformly or irregularly, in particular stochastically, over the periphery of the blade cascade, that is, for example, A1, B1, B2, A2, A3, . . . . In this way, it is possible advantageously to achieve a better frequency detuning.

One or a plurality of and, in particular, all elements of an element arrangement, can become or can be distributed, in particular, in or within a blade. Equally, one or a plurality of and, in particular, all elements of an element arrangement, can become or can be arranged between two blades that are adjacent to each other in the circumferential direction and can become or can be movably mounted on both of them. Therefore, for a more concise description, both individual blades and also two, three, or more blades that are adjacent to one another in the peripheral direction are referred to in the present case jointly as a blade arrangement.

Correspondingly, in one embodiment, the blade arrangements of the first, second, and/or at least one third group can each have exactly one blade on which and, in particular, in which the corresponding element arrangement is movably mounted. Equally, in one embodiment, the blade arrangements of the first, second, and/or at least one third group can each have a pair of, three, or more blades that are adjacent to one another in the peripheral direction, on which the respective element arrangement is or will be movably mounted, in particular a pair of blades that are adjacent to each other in the peripheral direction and on which the respective element arrangement is or will be movably mounted. The blades of a blade arrangement, in particular, that is, a pair of blades that are adjacent to each other in the peripheral direction, which form a blade arrangement, can be of the same type or of different type.

If, for example, the first blades A1, A2, A3, . . . and the second blades B1, B2, B3, . . . are arranged alternately in pairs, then two first or second blades that are adjacent to each other in the peripheral direction form a respective first or second blade arrangement and an element that is arranged between the two first or second blades and movably mounted on these respective two blades forms a first element arrangement a or a second element arrangement b, with the element arrangements a being identical to one another and the element arrangements b being different from one another and from the element arrangements a:

(A1-a-A2)-a-(B1-b-B2)-a-(A3-a-A4)-a-(B3-b-B4) . . .

As stated above, in one embodiment, first element arrangements that are identical to one another will be or are movably mounted on a majority of first blade arrangements that are of the same type to one another, and/or second element arrangements that are identical to one another are movably mounted on a majority of second blade arrangements that are identical to one another, and, in an enhancement, third element arrangements that are identical to one another are or will be movably mounted on a majority of third blade arrangements that are of the same type to one another.

In one embodiment, blade arrangements that are of different type from one another are or will be produced differently, in particular in a systematic manner, in particular being primarily shaped and/or reshaped and/or machined differently, whereas, correspondingly, blade arrangements that are of the same type to one another are or will be produced with identical construction or in an identical manner within the limits of fabrication tolerances, in particular being primarily shaped and/or reshaped and/or, in particular, machined to be contoured. Thus, in particular, all first blade arrangements can become or can be primarily shaped using the same first casting pattern and all second blade arrangements can become or can be primarily shaped using the same second casting pattern, which differs from the first casting pattern in the sense of its contour. If, after primary shaping or reshaping, the blade arrangements are machined to be contoured, then all first blade arrangements can become or can be machined using the same first machining pattern, such as, for example, a milling pattern, and all second blade arrangements can become or can be machined using the same second machining pattern, which differs from the first machining pattern in the sense of its contour. Equally, the blade arrangements can initially be produced in a systematic manner with identical construction or in a theoretically identical manner and then sorted into first, second, and, if applicable, third blade arrangements on the basis of variances that occur during fabrication.

Correspondingly, in one embodiment, first, second, and, if applicable, third blade arrangements have different contours, weights, and/or weight distributions. In particular, first, second, and, if applicable, third blade arrangements can differ by a different number, shape, and/or arrangement of recesses, in particular bores, cavities, cutouts, or the like.

If the blade arrangements comprise a monocrystalline material, then first, second, and, if applicable, third blade arrangements can have, additionally or alternatively to different contours, weights, and/or weight distributions, also different crystal orientations. In this case, the different production can comprise a sorting into corresponding batches, so that, for example, a primary shaping and classification of a monocrystalline blade, in accordance with its measured crystal orientation, into a first group and a primary shaping and classification of another monocrystalline blade, in accordance with its measured, different crystal orientation, into a second group represent a different production in the sense of the present invention.

In one embodiment, the characteristic frequencies of at least one characteristic shape of the same blades differ between first blade arrangements, on the one hand, and second blade arrangements, on the other hand, and if applicable, between first and third blade arrangements and between second and third blade arrangements, by at least 1%, in particular at least 5%, while the characteristic frequencies of this characteristic shape differ between blade arrangements of the same type by at most 0.9%, in particular by at most 0.1%.

In particular, in an enhancement, the characteristic frequencies of a torsional characteristic shape, in particular the first one, in particular around a predetermined axis, in particular a thread axis or the radial direction, and/or the characteristic frequencies of one bent characteristic shape, in particular the first one, in particular around a predetermined axis, in particular a thread axis, profile chord direction, blade thickness direction, or radial, axial, or peripheral direction, and/or the respective lowest characteristic frequencies of the respective frontmost, in particular sole, blades of all first blade arrangements in the direction of rotation differ from the characteristic frequencies of this characteristic shape or the respective lowest characteristic frequencies of the respective frontmost, in particular sole, blades of all second blade arrangements in the direction of rotation by at least 1%, in particular at least 5%, and, in an enhancement, the characteristic frequencies of this characteristic shape or the respective lowest characteristic frequencies of the respective frontmost, in particular sole, blades of all third blade arrangements in the direction of rotation differ by at least 1%, in particular at least 5%, from the characteristic frequencies of this characteristic shape or the respective lowest characteristic frequencies of the respective frontmost, in particular sole, blades of all first and second blade arrangements in the direction of rotation, whereas the characteristic frequencies of this characteristic shape or the respective lowest characteristic frequencies of the respective frontmost blades, in particular the sole blade, of all first blade arrangements in the direction of rotation differ among one another by at most 0.9%, in particular at most 0.1%; the characteristic frequencies of this characteristic shape or respective lowest characteristic frequencies of the respective frontmost, in particular sole, blades of all second blade arrangements in the direction of rotation differ among one another by at most 0.9%, in particular at most 0.1%; and, in an enhancement, the characteristic frequencies of this characteristic shape or respective lowest characteristic frequencies of the respective frontmost, in particular sole, blades of all third blade arrangements in the direction of rotation differ among one another by at most 0.9%, in particular at most 0.1%.

In other words, a deviation from a predetermined characteristic frequency between the blades can detune the assignment thereof to a first, second, or, if applicable, third type of blade arrangement.

In one embodiment, the two blade arrangements of the blade cascade that differ most strongly in the sense of their weight, weight distribution, crystal orientation, contour, and/or characteristic frequency of at least one predetermined characteristic shape or the lowest characteristic frequency form a first blade arrangement and a second blade arrangement in the sense of the present invention. In an enhancement, the two, three, or four blade arrangements of the blade cascade that are most similar in the sense of their weight, weight distribution, crystal orientation, contour, characteristic frequency of this characteristic shape, or lowest characteristic frequency of this first blade arrangement likewise form first blade arrangements in the sense of the present invention, and the two, three, or four blade arrangements of this blade cascade that are most similar in the sense of their weight, weight distribution, crystal orientation, contour, characteristic frequency of this characteristic shape or lowest characteristic frequency of this second blade arrangement likewise form second blade arrangements in the sense of the present invention.

In one embodiment, blade arrangements that are of different type from one another are or will be detuned in a systematic manner with respect to one another in at least one characteristic frequency and blade arrangements that are of the same type to one another are or will be detuned in a systematic manner with respect to one another in no characteristic frequency.

In one embodiment, element arrangements that are different from one another have a different number of elements. Thus, for example, first element arrangements can each have exactly one element and second element arrangements can each have at least two identical or different elements, which are or will be movably mounted on the respective blade arrangement. Additionally or alternatively, in one embodiment, element arrangements that are different from one another have elements with different contours, weights, and/or weight distributions, in particular exceeding the fabrication tolerances. Thus, for example, first element arrangements can each have an element that is heavier, in particular by at least 1%, and second element arrangements each have an element that is lighter, in particular by at least 1%, and/or first element arrangements can each have a cylindrical element and second element arrangements can each have a spherical element, which are or will be movably mounted on the respective blade arrangement. Additionally or alternatively, in one embodiment, element arrangements that are different from one another have elements with different positions and/or orientations relative to the respective blade arrangement and/or different mountings on the respective blade arrangement. Thus, for example, first element arrangements can each have an element mounted on an outer shroud and two element arrangements can each have an element mounted on an inner shroud or blade root, and/or first element arrangements can each have a conical element, the tip of which is oriented radially inward, and second element arrangements can each have a conical element, the tip of which is oriented radially outward.

In one embodiment, element arrangements that are different from one another change differently the characteristic frequency of at least one characteristic shape of the blade arrangements on which they are movably mounted by at least 1%, in particular by least 5%, whereas correspondingly identical element arrangements change differently the characteristic frequencies of blade arrangements on which they are movably mounted by at most 0.9%, in particular by at most 0.1%.

In one embodiment, element arrangements that are identical to one another identically detune the same blade arrangement, whereas element arrangements that are different from one another detune the same blade arrangement differently in a systematic manner.

For example, if the six blades of a blade cascade, without subordinate elements therein, have the characteristic frequencies $1F_{11}, 1F_{12}, 1F_{13}, 1F_{21}, 1F_{22}, 1F_{23}$ and the elements $k_{11}, k_{12}, k_{13}, k_{21}, k_{22}, k_{23}$ change this respective characteristic frequency by $\Delta_{ij}$, where the following holds: $|(1F_{1i}-1F_{1j})/1F_{1i}| \leq 0.009$ and $|(1F_{2i}-1F_{2j})/1F_{2i}| \leq 0.009$ and $|(1F_{1i}-1F_{2i})/1F_{1i}| \leq 0.01$ $\forall i=\{1, 2, 3\}$ and $j=\{1, 2, 3\}$ as well as $|(\Delta_{1i}-\Delta_{1j})/\Delta_{1i}| \leq 0.009$ and $|(\Delta_{2i}-\Delta_{2j})/\Delta_{2i}| \leq 0.009$ and $|(\Delta_{1i}-\Delta_{2i})/\Delta_{1i}| \geq 0.01$ $\forall i=\{1, 2, 3\}$ and $j=\{1, 2, 3\}$, then the blades having the characteristic frequency $1F_{11}, 1F_{12}, 1F_{13}$ form first blade arrangements and the blades having the characteristic frequency $1F_{21}, 1F_{22}, 1F_{23}$ form second blade arrangements, and the elements $k_{11}, k_{12}, k_{13}$ form first element arrangements, and the elements $k_{21}$, $k_{22}$, $k_{23}$ form second element arrangements in the sense of the present invention, so that, in accordance with the invention, in a systematic manner and in a manner specific to the type of blade arrangement, the first element arrangements are or will be mounted in a systematic way on the first blade arrangements and the second element arrangements are or will be mounted in a systematic way on the second blade arrangements.

Known from internal company practice for the detuning of blades are attenuating or damping elements, on the one hand, which, during operation, contact the blade arrangements permanently, in particular owing to centrifugal force, and dissipate kinetic energy through friction. Known from internal company practice, on the other hand, are impulse elements, which are dimensioned and mounted in such a way that, during operation, they deliver impacts to walls of the blade arrangements. Although, in this case, hardly any dissipation occurs as heat, it is also possible in this way to influence advantageously the vibrational behavior of the blade cascade. Correspondingly, in one embodiment, one element of an element arrangement can be a damping element, which is or will be mounted on the respective blade arrangement in such a way that, during operation, it contacts the blade arrangements, at least essentially, permanently and in particular owing to centrifugal force or it is set up or provided in order to dissipate kinetic energy through friction. Equally, in one embodiment, one element of an element arrangement can be an impulse element, which is or will be mounted on the respective blade arrangement in such a way that, during operation, it delivers impacts to walls of the blade arrangements or it is set up or provided for this purpose. The impulse element can be mounted in such a way that it does not contact the respective blade arrangement between impacts in the free flight phase.

In one embodiment, one or a plurality of respective first elements of a first element arrangement is/are or will be arranged or movably mounted on an outer shroud of the respective first blade arrangement. Additionally or alternatively, one or a plurality of respective second elements of a second element arrangement is/are or will be arranged or movably mounted on an outer shroud, an inner shroud, or a blade portion of the respective second blade arrangement. Equally, in one embodiment, one or a plurality of respective first elements of a first element arrangement can become or can be arranged or movably mounted on an inner shroud or a blade portion of the respective first blade arrangement. Additionally or alternatively, then, one or a plurality of second elements of a respective second element arrangement is/are or will be arranged or movably mounted on an outer shroud, an inner shroud, or a blade portion of the respective second blade arrangement.

According to an aspect of the present invention, a turbomachine, in particular a gas turbine, in particular an aircraft engine (gas turbine), has at least one turbine stage and/or at least one compressor stage having a blade cascade described here, in particular a rotatable rotor blade cascade or a stationary guide vane cascade.

According to an aspect of the present invention, a method for producing a blade cascade described here has the following steps:

arrangement of the first group of first blade arrangements, in particular on a rotor of the turbomachine, on which, in particular beforehand, in the process thereof, or subsequent thereto, the first element arrangements, which are identical to one another, are movably mounted in a systematic manner or in a manner that depends on the type of the first blade arrangements, and arrangement of the second group of second blade arrangements, which are of different type from the first blade arrangements, in particular on the rotor, on which, in particular beforehand, in the process thereof, or subsequent thereto, the second element arrangements, which are identical to one another and differ from the first element arrangements, are movably mounted.

In one embodiment, a stock of first and second blade arrangements as well as a stock of first and second element arrangements are supplied for this purpose and the blade arrangements are equipped with the respective element arrangements in a type-specific manner before, in the process of, or after the mounting thereof, in particular on a rotor or casing of the turbomachine.

BRIEF DESCRIPTION OF THE DRAWINGS

Additional advantageous enhancements of the present invention ensue from the dependent claims and the following description of preferred embodiments. Shown in partially schematic manner for this purpose are:

FIG. 1 a part of a rotor blade cascade of a gas turbine according to an embodiment of the present invention in a cross section and in an unwound state;

FIG. 2 a part of a rotor blade cascade of a gas turbine according to another embodiment of the present invention in a depiction corresponding to FIG. 1.

DETAILED DESCRIPTION OF THE INVENTION

Figure 3:
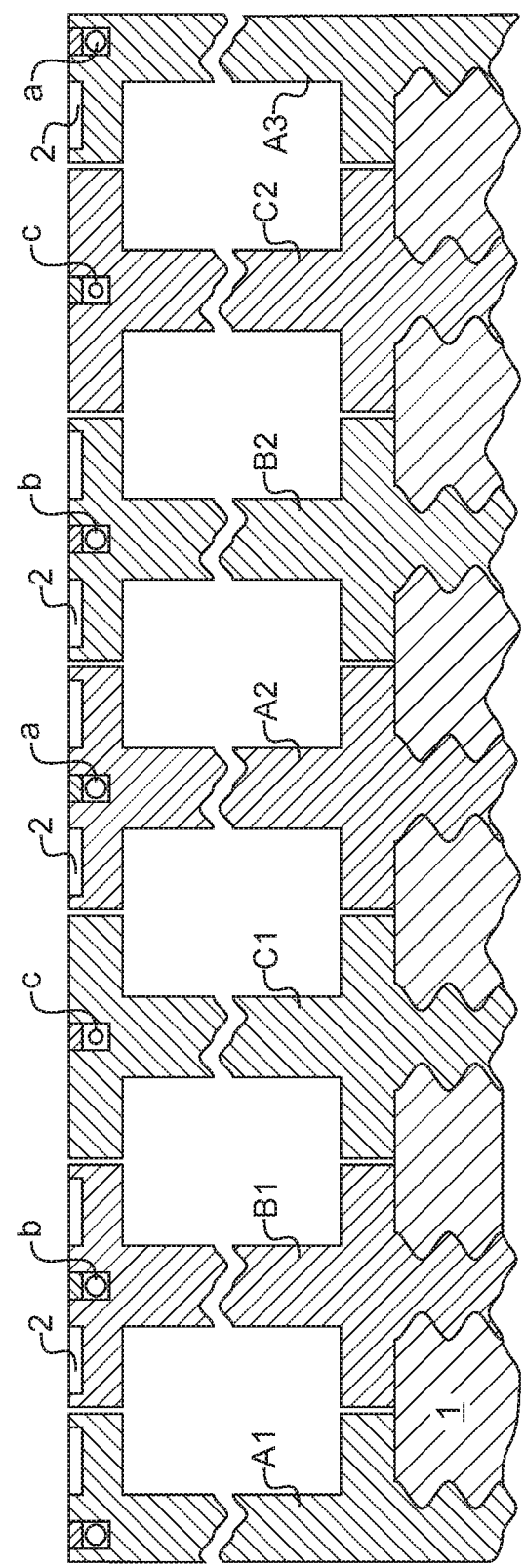
FIG. 3 a part of a rotor blade cascade of a gas turbine according to yet another embodiment of the present invention in a depiction corresponding to FIG. 1.

FIG. 1 shows a part of a rotor blade cascade of a gas turbine according to an embodiment of the present invention in a cross section perpendicular to an axis of rotation of the gas turbine.

The rotor blade cascade has a first group of first blade arrangements of the same type in the form of individual rotor blades fastened to a rotor 1 of the gas turbine by means of a fir tree-like base, of which five first rotor blades of the same type, A1, A2, . . . , A5 (partially), are depicted in FIG. 1.

These first blade arrangements of the same type, A1, A2, . . . , are produced with an identical construction and correspondingly have the same contours, weights, weight distributions, and characteristic frequencies, in particular the same recesses 2.

A first element arrangement, which has a respective first element a, is movably mounted in the outer shrouds of all first blade arrangements, with these element arrangements all being identical to one another. The movably mounted first elements a improve the vibrational behavior of the rotor blade cascade during operation thereof.

The blade cascade further has a second group B of blade arrangements that are of the same type to one another in the form of individual rotor blades, which are fastened to the rotor by means of a fir tree-like base, of which two second rotor blades B1, B2 of identical type are depicted in FIG. 1.

These second blade arrangements that are of the same type, B1, B2, are likewise produced with an identical construction and correspondingly have the same contours, weights, weight distributions, and characteristic frequencies. However, they are produced in a different way from the first blade arrangements A and correspondingly have contours, weights, weight distributions, and characteristic frequencies that are of different type than those of the first blade arrangements A. By way of example, the second blade arrangements, in contrast to the first blade arrangements A, do not have recesses on the outer shroud, so that their characteristic frequencies 1E, 1F, in particular, differ by at least 1% from the characteristic frequencies 1E and 1F, respectively, of the first blade arrangements.

A respective second element arrangement, which has a second element b, is movably mounted in the outer shrouds of all second blade arrangements, with these element arrangements being identical to one another. The movably mounted second elements b likewise improve the vibrational behavior of the rotor blade cascade during operation.

The first element (arrangements) a and second element (arrangements) b differ from each other. In the exemplary embodiment of FIG. 1, the first element arrangements are each, by way of example, composed of a ball-shaped or spherical element a having a larger contour and weight, while the second element arrangements, which differ from them, are each, by way of example, composed of a ball-shaped or spherical element b having a smaller contour and weight in comparison to them.

Accordingly, the element arrangements a, b will be or are assigned to the blade arrangements A, B in a specific manner or in a systematic manner that is type-specific or in a manner that depends on the type of blade arrangement. As a result, undesired vibrations of the blade cascade can be greatly reduced.

FIG. 2 shows, in a way corresponding to FIG. 1, a portion of a rotor blade cascade of a gas turbine according to another embodiment of the present invention. Elements that correspond to each other are identified by identical reference characters, so that reference is made to the preceding description and differences are addressed below.

In the embodiment of FIG. 2, the first elements a and the second elements b, by way of example, do not have a differing ball-shaped contour, but rather the same orientatable contour having a shoulder or a flattened tip. They are each arranged between two rotor blades that are adjacent in the peripheral direction (horizontal in FIG. 2), engage in corresponding cavities in the inner shrouds of these blades, and thus are movably mounted on both rotor blades of a pair of rotor blades that are adjacent in the peripheral direction.

The first elements a and the second elements b have orientations that differ from one another relative to the respective blade arrangement; by way of example, in the embodiment of FIG. 2, the flattened tips of the first element a are directed radially outward (upward in FIG. 2) and the flattened tips of the second elements b are oppositely directed, by contrast, radially inward.

In the embodiment of FIG. 2, first blade arrangements of the same type, U1, U2, . . . , each is composed of a pair of blades that are of the same type, A1+A2, A3+A4, . . . , which are adjacent in the peripheral direction, whereas second blade arrangements, V1, V2, V3, V4, . . . , which are of different type from the first blade arrangements and of the same type to one another, each is composed of a pair of different types of blades A2+B1, B1+A3, A4+B2, B2+A5, . . . , which are adjacent in the peripheral direction.

A respective first element arrangement, which has a first element a, is movably mounted on the two rotor blades of all pairs of first blade arrangements U1, U2, . . . , whereas a respective second element arrangement with a second element b, is movably mounted on the two rotor blades of all pairs of second blade arrangements V1, V2, . . . . It can be seen that the orientation of the individual elements (radially outward/inward) and thus the element arrangement (a/b) depends on the respective blade arrangement, that is, on the pair of rotor blades, between which the element is arranged and on which it is movably mounted respectively. It thereby becomes clear as well that, in general, in an embodiment of the present invention, the same rotor blade can equally be a part of a first blade arrangement and a second blade arrangement. In the embodiment of FIG. 1, in contrast, each rotor blade is only a component of a single blade arrangement. Correspondingly, in general, in an embodiment of the present invention, each rotor blade is always clearly only a component of a respective first blade arrangement or second blade arrangement (or, if applicable, a third blade arrangement). It also becomes clear that even in the embodiment of FIG. 2, a respective first element a is movably mounted on each first blade A1, A2, . . . and a respective second element b is movably mounted on each second blade B1, B2, . . . .

Although, in the preceding description, exemplary embodiments were explained, it is noted that a large number of modifications are possible. For instance, FIG. 3 shows a blade cascade of two blades of the same type to one another, A1 and A2, two blades of the same type to one another, B1 and B2, which are of different type than the blades A1 and A2, and two blades of the same type to one another, C1 and C2, which are of different type than the blades A1 and A2, and of different type than the blades B1 and B2. At least three sets of identical element arrangements are or will be movably mounted on blade arrangements of one of the groups, which are of different type from them and of the same type to one another. For example, the blades A1 and A2 can be equipped with the same element arrangements a and the blades B1 and B2 can be or can become equipped with the same element arrangements b, and the blades C1 and C2 are or will be equipped with the same element arrangements c. Moreover, it is noted that, the exemplary embodiments are merely examples that are not intended to limit the protective scope, the applications, and the construction in any way. Instead, the preceding description provides the person skilled in the art with a guideline for implementing at least one exemplary embodiment, with it being possible to make diverse modifications, in particular in regard to the function and arrangement of the described components, without departing from the protective scope, as ensues from the claims and combinations of features equivalent thereto.

The invention claimed is:

1. A blade cascade for a gas turbine, comprising
   a first group with
     at least two,
     first blade arrangements that are of the same type to one another, wherein each blade of the first blade arrangements comprises a
       first detuner arrangement having at least one first detuner and having only one detuner type movably mounted therein, wherein each first detuner arrangement on each blade of the first blade arrangements is identical to one another; and
   a second group with
     at least two, second blade arrangements, which are of the same type to one another and of different type from the first blade arrangements, wherein each blade of the second blade arrangements comprises a
     second detuner arrangement having at least one second detuner and having only one detuner type movably mounted therein, wherein each second detuner arrangements on each blade of the second blade arrangements is identical to one another and of different type than the first detuner arrangement on the blades of the first blade arrangements.

2. The blade cascade according to claim 1, further comprising:
a third group with
at least two, third blade arrangements, which are of the same type to one another and of different type from the first and second blade arrangements, wherein each blade of the first blade arrangements comprises a
third detuner arrangement having at least one third detuner and having only one detuner type movably mounted therein, wherein each third detuner arrangement on each blade of the third blade arrangement is identical to one another,
wherein first detuner arrangements, second detuner arrangements, and third detuner arrangements are different from one another.

3. The blade cascade according to claim 1, wherein the blade arrangements of at least one of the groups in each case has exactly one blade, on which the respective detuner arrangement is movably mounted.

4. The blade cascade according to claim 1, wherein the blade arrangements of at least one of the groups in each case has a pair of blades that are of the same type or of different type and are adjacent in the peripheral direction, on which the respective detuner arrangement is movably mounted.

5. The blade cascade according to claim 1, wherein detuner arrangements that are identical to one another are movably mounted on a majority of the blade arrangements, which are of the same type to one another, of at least one of the groups.

6. The blade cascade according to claim 1, wherein blade arrangements that are of a different arrangement from one another and being primarily shaped and/or reshaped and/or machined differently and having different contours, weights, weight distributions, and/or monocrystalline materials with different crystal orientations.

7. The blade cascade according to claim 1, wherein the detuner arrangements that are different from one another have a different number of elements and/or elements with different contours, weights, and/or weight distributions, position, orientations, and/or mountings.

8. The blade cascade according to claim 1, wherein at least one detuner of the detuner arrangements is arranged on an outer shroud, an inner shroud, or a blade root of the blade arrangement.

9. The blade cascade according to claim 1, wherein the blade cascade is arranged in an aircraft engine as a configuration selected from the group consisting of a rotor blade cascade and guide vane cascade.

* * * * *